Oct. 29, 1968 W. A. CARTER 3,408,468
DIFFERENTIAL PRESSURE ACTUATED SWITCH UTILIZING HIGH
SPEED LATCH AND LOST MOTION MEANS
Filed Oct. 28, 1966 4 Sheets-Sheet 4
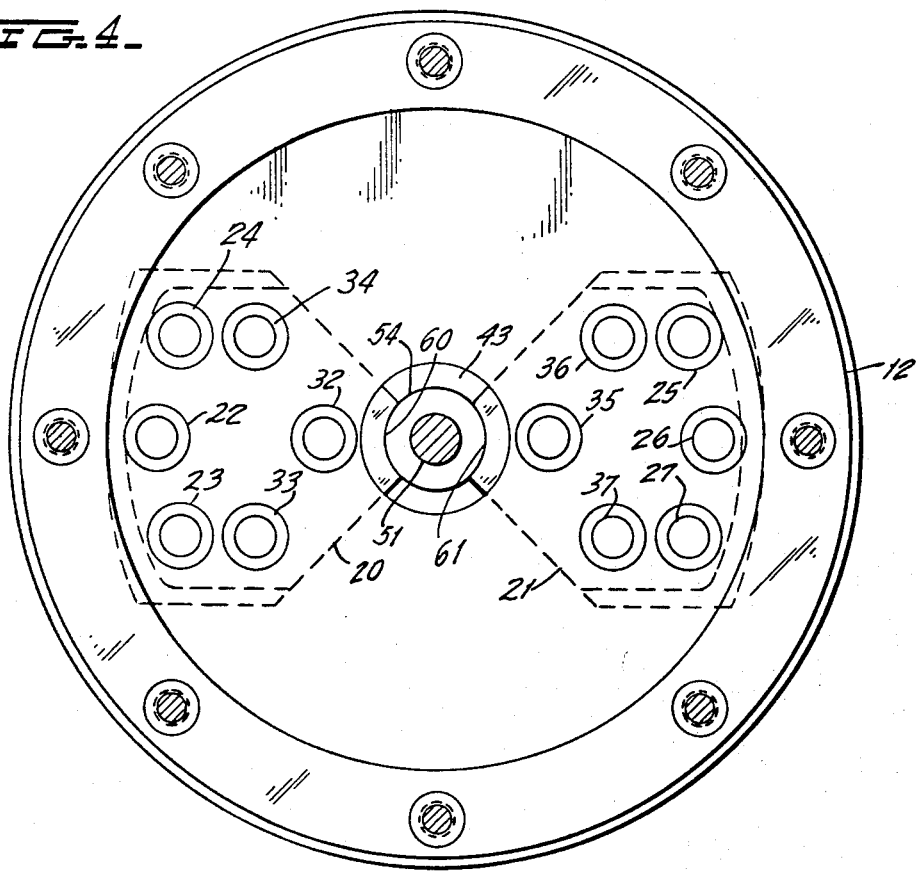
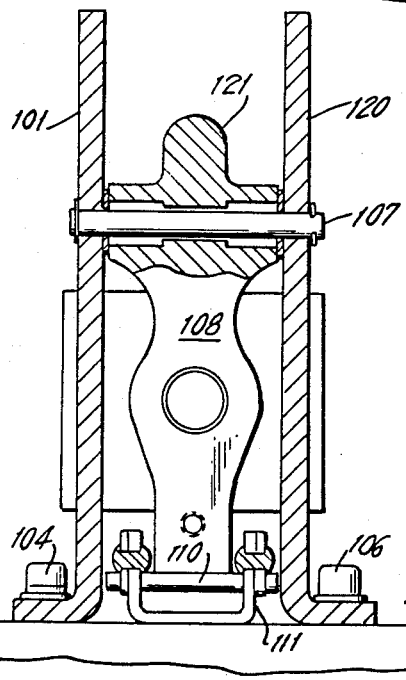
INVENTOR.
WILLIAM A. CARTER
BY
OSTROLENK, FABER, GERB & SOFFEN
ATTORNEYS

United States Patent Office 3,408,468
Patented Oct. 29, 1968

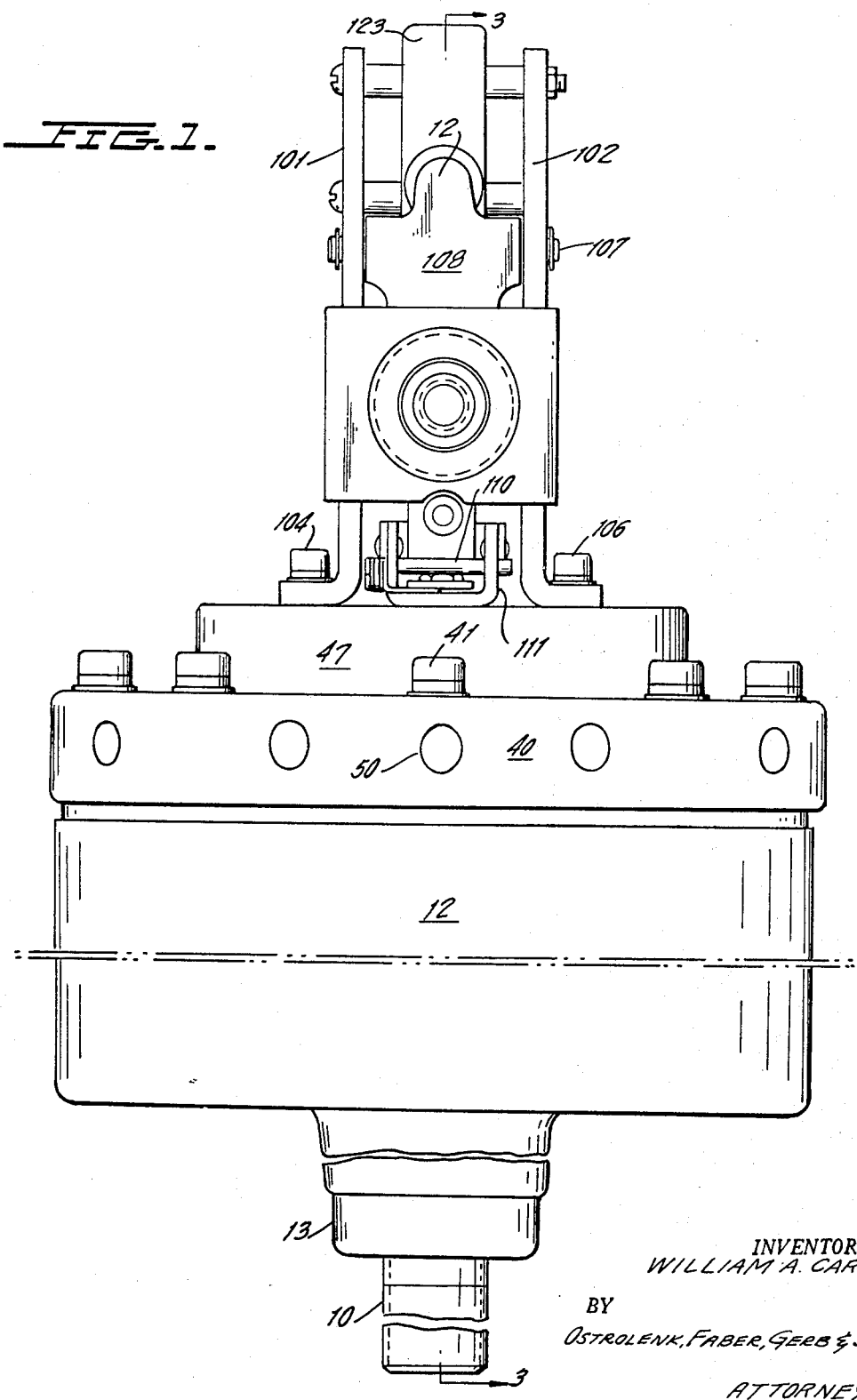

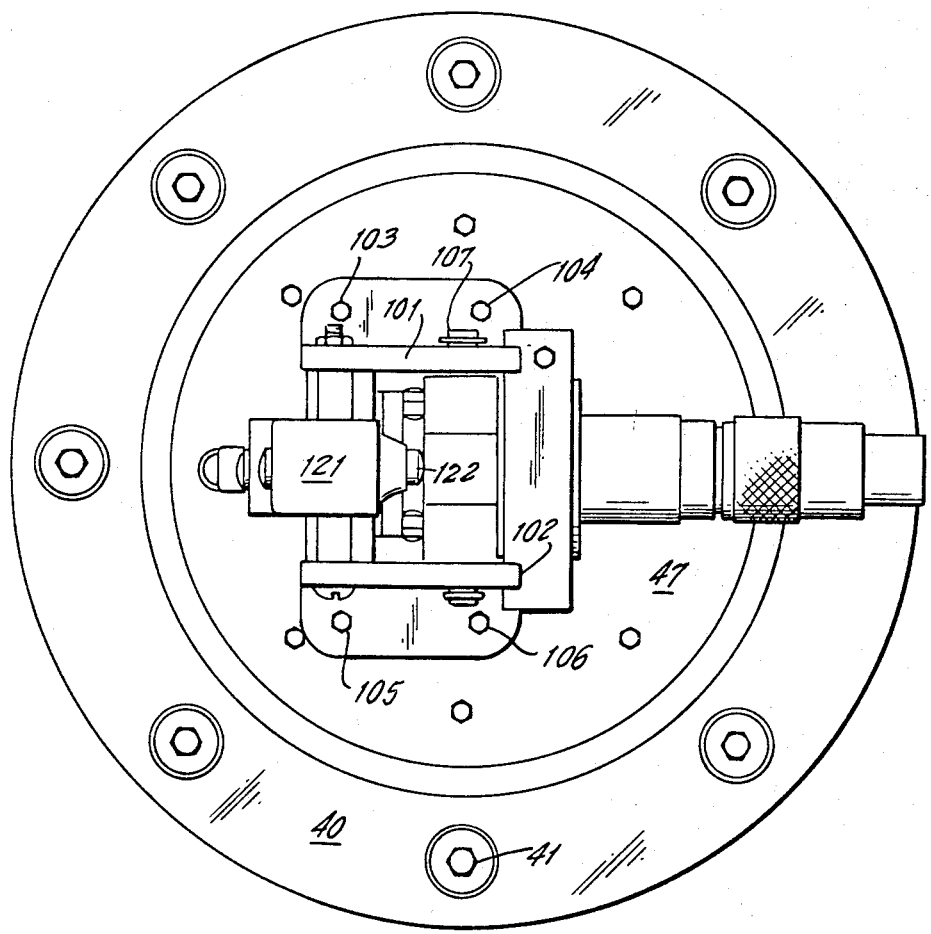

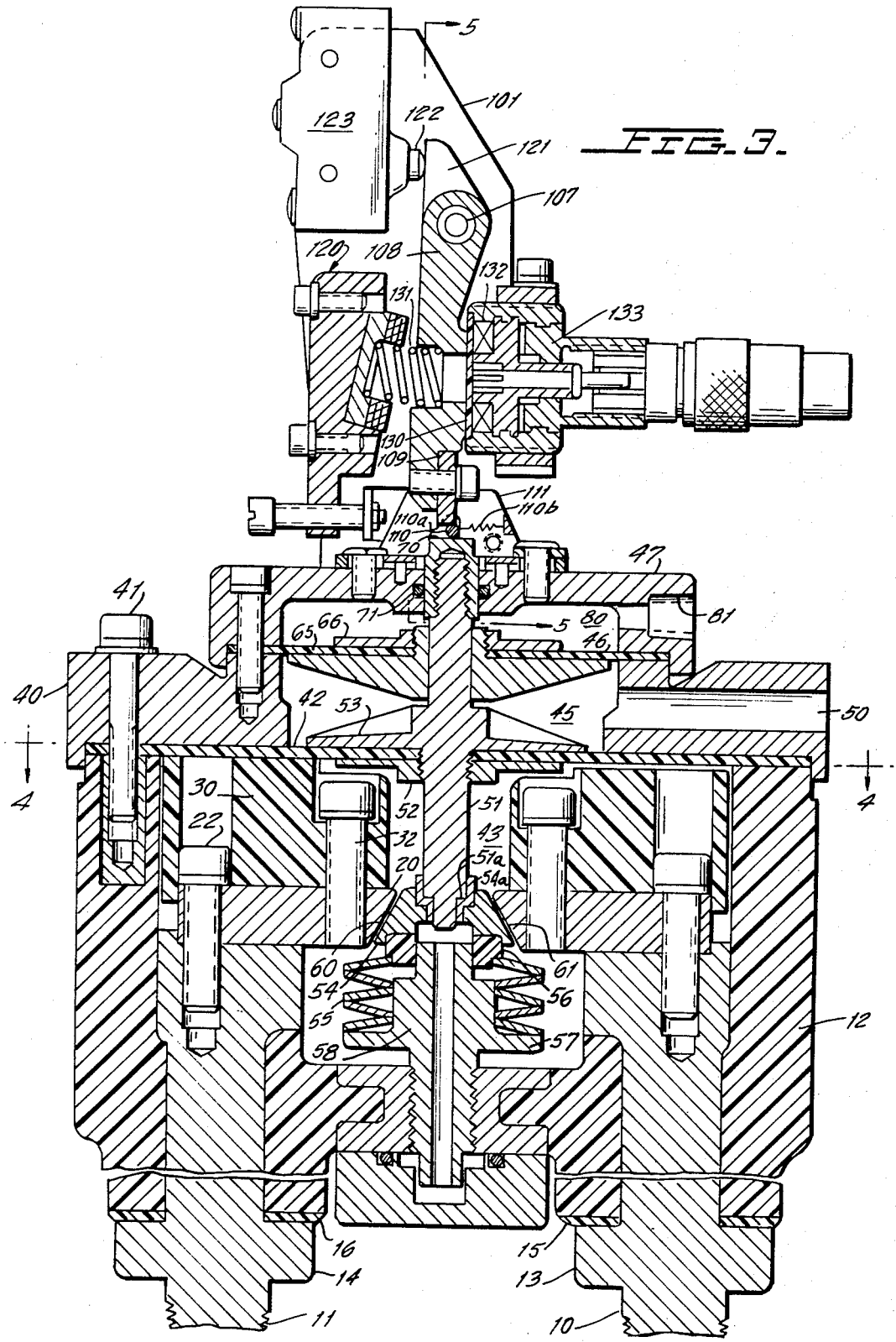

3,408,468
DIFFERENTIAL PRESSURE ACTUATED SWITCH UTILIZING HIGH SPEED LATCH AND LOST MOTION MEANS
William A. Carter, Devon, Pa., assignor to I-T-E Circuit Breaker Company, Philadelphia, Pa., a corporation of Pennsylvania
Filed Oct. 28, 1966, Ser. No. 590,303
7 Claims. (Cl. 200—83)

ABSTRACT OF THE DISCLOSURE

This disclosure describes a high speed, high accuracy closing switch in which the movable contact is provided with strong closing biasing springs. A differential pressure operated diaphragm holds an operating rod in abutting relation with the contact to hold the contact open against the force of its biasing springs. A high speed latch holds the rod against the differential pressures across the diaphragm to normally hold the contact open. When the latch is removed, the differential pressure causes the high speed motion of the operating rod away from the movable contact with the high pressure springs rapidly closing the contact.

---

The present application is an improvement of copending application Ser. No. 586,238, in the name of Otto Jensen, entitled, "High Speed Making Switch," filed Oct. 12, 1966, now pending and assigned to the assignee of the present invention.

This invention relates to electrical switches, and more specifically relates to a novel ultrahigh speed electrical switch for closing an electrical circuit some very short and controlled predetermined time after the initiation of a closing signal.

Very fast operation is essential in switches which are used to by-pass faulted equipment or to apply an intentional fault on an electrical component during test conditions.

Thus, in circuit breaker testing, it is common practice to initiate a fault or short-circuit at a pre-selected instant on the applied voltage wave. For good test results, it is essential that the fault start at this very accurate and pre-selected time. As another example of such devices, short-circuiters are well known for the protection of electrical equipment wherein the short circuiter will form a parallel path about the equipment to protect it from a fault circuit condition. In these typical applications, consistent closing time and fast operation are essential.

Switches of this type must be able to withstand normal voltage across their open contacts, and must be able to carry very large currents for several seconds. In order to satisfactorily withstand voltage, the open switch gap must be wide. This will increase the contact travel required for closing and increases the demands on acceleration necessary to complete the closing motion in a very short time. The problem is further aggravated by the requirement of the device to carry heavy currents which requires that the moving contact is normally very heavy, thus increasing the force required for high acceleration. The required heavy closing forces further create their own problems such as contact bounce during closing which results in contact erosion and causes frictional drag which causes erratic closing times.

Another problem commonly associated with making switches is pre-arcing, which consists of the dielectric break-down of the contact gap while the contacts are approaching one another, and a high current arc until metallic contact is made. This pre-arcing will also introduce errors in the time of initiation of a fault current and produces severe contact erosion.

Above noted copending application Ser. No. 586,238 provides a novel closing switch which substantially overcomes all of the above noted previously existing problems with this type of apparatus. In accordance with the invention, a movable contact carried on a flexible diaphragm is supported within a sealed chamber which is filled with some suitable high dielectric gas. The contacts are contained within the sealed chamber, and are moved by differential pressure on opposite sides of the support diaphragm. The contacts are normally latched open by a suitable high accuracy, high speed latch such as a roller latch. Thus, extremely fast movement of the contact can be obtained by the differential pressure on the diaphragm when the latch is removed. Moreover, smaller open-contact spacing can be used, and less pre-arcing occurs due to the high dielectric medium in which the contacts are immersed.

In addition, since the switch is operated by gas pressure differentials, very high contact operating forces can be obtained to decrease and eliminate contact bounce, and to permit use of relatively heavy moving parts to satisfy a high load current capacity of the device when it is closed.

Finally, the complete structure is arranged in a U-shaped path so that the magnetic forces caused by current flow through the contact tend to hold the contact closed with the well-known "blow-on" effect.

A high speed release mechanism for operating the system to its closed position then incorporates a roller latch which is operated by the repulsion of a short-circulated turn, movable with the roller latch, which is energized by a stationarily mounted winding which induces current in the short-circuited turn to cause magnetic repulsion and high speed removal of the latch.

In the above noted application Ser. No. 586,238, the contact is connected directly to an operating rod extending from the contact operating diaphragm. Thus, when moving the contact to a closed position, it was necessary to accelerate the full mass of the operating rod, diaphragm and contact. In accordance with the present invention, contact is biased closed by a heavy spring means. Once the contact is closed, the spring provides a high closing contact pressure. A "lost-motion" connection is made between the operating rod and contact so that the initial operating forces move only the operating rod with the contact following the rod under the forces of its biasing spring. After the rod reaches its maximum position, the lost motion is taken with the contact catching up with the rod end seating against the stationary contacts with high pressure.

Accordingly, a primary object of this invention is to provide a novel high speed making switch which has improved contact pressure when closed.

Another object of this invention is to provide a high speed making switch which is closed at a consistent closing time after the reception of an operating impulse wherein the operating mechanism is initially movable independently of the movable contact.

A further object of this invention is to provide a novel high speed making switch having improved contact pressure which is capable of conduction of very large currents for several seconds.

Still another object of this invention is to provide a novel high speed making switch which is pneumatically operated, whereby high operating forces can be used for the sequential acceleration of relatively low mass moving components.

These and other objects of this invention will become apparent from the following description when taken in connection with the drawings, in which:

FIGURE 1 is a side plan view of a making switch which incorporates the present invention.

FIGURE 2 is a top view of FIGURE 1.

FIGURE 3 is a cross-sectional view of FIGURE 1 taken across the line 3—3 in FIGURE 1 and particularly illustrates the present invention.

FIGURE 4 is a cross-sectional view of FIGURE 3 taken across the line 4—4 in FIGURE 3.

FIGURE 5 is a partial cross-sectional view of FIGURE 3 taken across the line 5—5 in FIGURE 3.

Referring now to the drawings and particularly FIGURES 1, 2 and 3, the high speed making switch illustrated therein is provided with two threaded terminals 10 and 11 which are mounted in an insulation body 12 and are embedded therein. Body 12 may be of any suitable epoxy, or the like, and forms an air-tight seal about flanges 13 and 14 of conductive terminals 10 and 11, and could include suitable gaskets such as gaskets 15 and 16.

A pair of stationary contacts 20 and 21 which have the shape shown in dotted lines in FIGURE 4 then seat atop the upper ends of electrodes 10 and 11 and are mechanically and electrically connected thereto by suitable bolts such as the bolt 22, shown in FIGURES 3 and 4, along with two similar spaced bolts which pass through the tapped openings 23 and 24 in stationary contact 20, as shown in FIGURES 3 and 4, to engage outwardly disposed regions of the end of the terminal 11 adjacent stationary contact 20.

In a similar manner, three bolts 25, 26 and 27 connect stationary contact 21 to the upper end of terminal 10, as shown in FIGURE 4.

To further provide secure connection between stationary contacts 20 and 21 and their terminals 11 and 10, respectively, upper insulating pressure disc 30, shown in FIGURE 3, seats atop stationary contacts 20 and 21.

The disc 30 will have suitable openings therethrough conforming to the locations of screws 22, 23, 24 and screws 25, 26 and 27, and will further have openings therein for the reception of bolts such as bolt 32, shown in FIGURES 3 and 4, for the direct securement of the stationary contacts 20 and 21 to their conductive members 30 and 31. Additional support bolts may also be provided for this function such as support bolts 33 and 34 for connecting disc 30 to terminal 11, while the bolts 35, 36 and 37 connect disc 30 to terminal 10.

A top support structure 40 which is of metallic material such as aluminum is then provided atop the housing 12 and is secured to the housing 12 as by a plurality of bolts, such as bolt 41, which encircle the top of the cap 40. The cap 40 further provides mechanical securement for the insulation material support diaphragm 42 which will be described more fully hereinafter as the support for the movable contact structure, and which may be made of any suitable resilient material such as a suitable rubber composition material such as neoprene.

The diaphragm 42 extends completely across the upper surface of housing 12 and defines a sealed chamber 43 which may be connected by a suitable channel to a suitable source of high pressure gas such as sulphur hexafluoride which can fill chamber 43 under high pressure.

A second chamber 45 is defined atop diaphragm 42, and is enclosed by a second rubber composition diaphragm 46 which is connected to the cap 40 by a second cap 47 which may be of insulation material. The second cap 47 is secured to the cap 40 by suitable bolts such as bolt 48, best shown in FIGURES 2 and 3, which encircle cap 47.

The chamber 45 defined between diaphragms 42 and 46 is then normally connected to external atmosphere by means of a plurality of vents such as vent 50 which extend around the periphery of cap 40.

Diaphragm 42 then carries a movable conductive rod 51, best shown in FIGURE 3, which is connected to diaphragm 42 by a lock-nut 52 threaded on the threaded region of rod 51 and abutting against the first extending flange 53 extending from rod 51. In accordance with the invention, the lower end of rod 51 is then terminated in a necked-down shoulder 51a.

The reduced diameter section at the end of rod 51 is then slidably received in the cup 54a of conical movable contact 54. Conical movable contact 54 is then biased toward normal high pressure contact engagement with arcuate stationary contact segments 60 and 61 of stationary contacts 20 and 21, the shapes of which are best shown in FIGURE 4, by means of spring washers 55. Spring washers 55 are captured between insulating washer 56 on the bottom of contact 54 and the shoulder 57 of spring holder 58 which is threaded into a suitable metallic insert cast in body 12.

This novel structure of the present invention thus permits high pressure forces from springs 55 to normally close contact 54, and also permits the initial upward movement of rod 51 independently of the mass of contact 54 due to the lost-motion connection between shoulder 51a and the bottom of contact cup 54a. Thus, contact motion begins only after shoulder 51a leaves the bottom of cup 54a, with the contact moving under the influence of heavy bias springs 55.

The upper end of rod 51 beyond flange 53 threadably passes through a stop member 65 which is carried on diaphragm 46 by means of a lock-nut 66 threaded to the extending stem portion of member 65 extending through diaphragm 46. The uppermost end of rod 51 then receives a latch receiving member 70 which is secured thereto as by threading in the manner illustrated. Note that the latch-receiving member 70 passes through a central opening in the upper cup 47 through a sealing gasket 71.

From the foregoing structure, it will be seen that the movable contact 54 can move upwardly into engagement with contacts 20 and 21 by springs 55 when the rod 51 is moved upwardly, this motion being permitted by the flexing of diaphragm 42 under the differential pressure applied thereacross with the upward motion of rod 51 being permitted when the latch-receiving member 70 is free to move upwardly.

This motion is caused by the high pressure gas within volume 43 below diaphragm 42 when the chamber 45 on top of diaphragm 42 is vented to open air. This high pressure gas also serves the function of preventing prearcing between movable contact 54 and stationary contacts 30 and 31. Moreover, the provision of the high pressure gas permits the use of a smaller open-gap spacing between the cooperating contacts to withstand the normal voltage conditions across the open contacts so that relatively short contact travel is required to close the switch.

The closing operation of the switch can be obtained by introducing a sufficiently high pressure in volume 80 through the opening 81 which will cause diaphragm 46 to move downwardly with the member 65 moving into engagement with flange 53, thereby to move the flange, and thus stem 51, downwardly. Shoulder 51a then reaches the bottom of cup 54a to move contact 54 to the open position and permits the resetting of the latch.

It will be apparent that any suitable high latch speed mechanism could be used with the novel switch construction of the drawings. For purposes of illustration, the present disclosure describes a roller latch structure for the latch function. More particularly, the latch structure is generally supported between a pair of upstanding arms 101 and 102 which are bolted to the upper cap 47 as by bolts 103–104 and 105–106, respectively, as best shown in FIGURE 2.

A pivotally mounted shaft 107 is supported between support arms 101 and 102 and pivotally carries a metallic rotatable latch arm 108 which has a hardened steel latch plate 109 connected at the bottom thereof. The bottom of latch plate 109 then cooperates with a roller latch 110 which is carried in a triangular opening 110a of a U-shaped frame 111 which is suitably secured to the upper cap 47. The roller latch is movable along the bottom of triangular opening 110a, and is biased to the right in FIGURE 3 by schematically illustrated spring 110b.

Frame 111 is adjustably located on latch surface 70 by adjustment of adjusting screw 31 to cause the latch plate to rest on roller 110 so that the center line of the roller is about 0.015 inch behind the right vertical edge of latch plate 109.

The latch arm 108 is rotatable in a clockwise direction in FIGURE 3 against a suitable motion buffer structure 120 which is suitably mounted between arms 101 and 102, while the upper end of latch arm 109 extending above the pivot 107 has a position switch operating extension 121 which operates the contact actuator 122 of an auxiliary switch 123 which is supported between arms 101 and 102 in any desired manner.

In operation, the latch arm 108 is normally biased to the position shown in FIGURE 3 by means of the biasing spring 131 extending between arm 108 and the buffer structure 120. An operating winding which is insulated from conductive arm 108 by epoxy disc 130 is then embedded in a stationarily mounted adjustment structure 133 which is supported between arms 101 and 102. Energization of winding 132, as by a capacitor discharge circuit, will induce current flow in the conductive latch arm 108. This induces circulating current in the effective short-circuited turn of conductive latch arm 108 and strong repulsion forces will exist between latch arm 108 and winding 132 which will cause the rapid clockwise rotation of latch arm 108 about its pivot 107. This motion is subsequently arrested by the buffer 120.

When the latch plate 109 moves off the roller 110, roller 110 can rotate with respect to its support, thereby permitting the high pressure in chamber 43 to press rod 51 upwardly with an extremely rapid motion, thereby to cause contact engagement of contact 54 with the fixed contacts 20 and 21.

In order to adjust the latching mechanism, a micrometer adjusting structure is provided. The adjustment is obtained in two ways. The first consists of adjusting the impulse coil structure 133 to position the right-hand vertical surface of latch plate 109 approximately 0.015 inch beyond the center line of shaft 51. The remaining portion of the micrometer adjustment consists of the proper positioning of latch roller 110, as described previously.

In order to reopen the switch and to permit the relatching of latch plate 109 and latch roller 110, air pressure is applied to chamber 80 above diaphragm 46 through the air pressure connection conduit 81. This presses member 65 downwardly until it engages flange 53, whereupon flange 53 and its rod 51 will move downwardly as a single unit, thereby to move contact 54 to its normal open position. At the same time, the upper latching surface 70 will move below latch roller 110 so that latch plate 109 can seat atop the latch plate 110 with the latch bite called for by the latch adjustment mechanism. Note that the microswitch 123 can be connected in a suitable electrical circuit which will indicate the open or closed condition of contacts 54, 20 and 21 through the location of pivot arm 108.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A high speed making switch comprising the combination of first and second spaced stationary contacts; a movable contact movable into and out of engagement with said first and second stationary contact; a first enclosed chamber hermetically sealing said first and second stationary contacts and said movable contact; high pressure gas in said first enclosed chamber; a first flexible diaphragm forming one wall of said first enclosed chamber; said movable contact connected to the side of said first flexible diaphragm interior of said first enclosed chamber; the exterior side of said first flexible diaphragm connected to a relatively low pressure region compared to the pressure of said high pressure gas; extending latch rod means connected to said movable contact and extending outwardly of said first enclosed chamber and from the said exterior of said flexible diaphragm; and latch means cooperating with said latch rod and movable between a latched and unlatched position with respect to said latch rod; said latch means holding said movable contact spaced from said first and second stationary contacts when in said latched position with respect to said latch rod against the differential pressure across said first diaphragm; said first diaphragm flexing in a direction to move said movable contact into engagement with said first and second stationary contacts when said latch means is in its said unlatched position under the force of the differential pressure across said first diaphragm; the improvement which comprises an abutting connection between the end of said latch rod and said movable contact and biasing said movable contact toward engagement with said first and second stationary contact; said latch rod movable with said first diaphragm in a direction away from said movable contact to permit movement of said movable contact to said engagement by the force of said biasing means.

2. The device as set forth in claim 1 which includes opening means connected to said latch rod means for moving said latch rod means into said abutting connection with said movable contact for moving said movable contact out of engagement with said first and second stationary contacts and permitting the latching of said latch means.

3. The device as set forth in claim 1 wherein said closing means includes a second diaphragm forming one wall of a second sealed chamber; said latch rod extending through said second sealed closure; a lost-motion connection connecting said second diaphragm to said latch rod whereby the application of pressure in said second chamber moves said diaphragm into engagement with said latch rod into said abutting connection with said movable contact to move said movable contact out of engagement with said first and secoind stationary contacts.

4. The device as set forth in claim 1 which includes first and second elongated terminal conductors connected to said first and second contacts, respectively; said first and second terminal conductors parallel to one another and defining the arms of a U-shaped current path which includes said first and second stationary contacts at the bottom of said U; said U-shaped current path defining a blow-on effect for moving said movable contact into high force engagement with said first and second stationary contacts when current flows in said U-shaped path.

5. The device as set forth in claim 4 wherein said U-shaped current path is substantially embedded in an insulation housing; a portion of said insulation housing defining a portion of the walls of said first hermetically sealed enclosure.

6. A high speed making switch comprising a stationary contact, a movable contact movable into and out of engagement with said stationary contact; an enclosed chamber hermetically sealing said stationary and movable contacts; a high dielectric high pressure gas in said enclosed chamber; a flexible diaphragm forming one wall of said enclosed chamber; said movable contact connected to the side of said flexible diaphragm interior of said enclosed chamber; the exterior side of said flexible diaphragm connected to a relatively low pressure region compared to the pressure of said high pressure gas, and operating rod means connected to said movable contact and extending outwardly of said enclosed chamber and from the exterior of said flexible diaphragm; the improvement which comprises a spring bias means connected to said movable contact biasing said movable contact toward engagement with said stationary contact, and lost-motion connection means connecting said movable contact and said operating rod.

7. The device as set forth in claim 6 which further includes latch means cooperating with said operating rod means and movable between a latched and unlatched position with respect to said operating rod; said latch means holding said operating rod and said movable contact in one of its engaged or disengaged positions with respect to said stationary contact against the force due to differential pressure across said diaphragm when said latch means is in its said latched position; said diaphragm moving said movable contact to the other of its engaged or disengaged positions with respect to said stationary contact when said latch means moves to its said unlatched position.

References Cited

UNITED STATES PATENTS

| | | | |
|---|---|---|---|
| 2,270,608 | 1/1942 | Sandberg | 200—83 |
| 2,582,483 | 1/1952 | Hallerberg | 200—83.1 |
| 2,765,743 | 10/1956 | Hollinshead | 200—83 XR |
| 2,767,277 | 10/1956 | Wirth | 200—83 |
| 2,837,611 | 6/1958 | Detwiler et al. | 200—83.5 |

ROBERT K. SCHAEFER, *Primary Examiner.*

H. BURKS, *Assistant Examiner.*